United States Patent [19]

Payton

[11] 4,104,801

[45] Aug. 8, 1978

[54] DRAWING INSTRUMENT

[75] Inventor: Raymond Anthony Payton, Bewdley, England

[73] Assignee: Helix International Limited, West Midlands, England

[21] Appl. No.: 817,104

[22] Filed: Jul. 19, 1977

[30] Foreign Application Priority Data

Nov. 19, 1976 [GB] United Kingdom ............... 48257/76

[51] Int. Cl.$^2$ ............ G01B 3/16

[52] U.S. Cl. ............ 33/27 B; 33/157

[58] Field of Search ............ 33/27 B, 157

[56] References Cited

U.S. PATENT DOCUMENTS

| | | | |
|---|---|---|---|
| 530,680 | 12/1894 | Cole | 33/157 |
| 831,354 | 9/1906 | King | 33/157 |
| 902,257 | 10/1908 | Schoenner | 33/157 |
| 2,080,917 | 5/1937 | Hochman | 33/151 |
| 3,842,508 | 10/1974 | Gentils | 33/157 |

*Primary Examiner*—Harry N. Haroian

*Attorney, Agent, or Firm*—Lowe, King, Price & Markva

[57] ABSTRACT

A drawing instrument comprises a pair of limbs pivoted together at their inner ends to form an assembly. A bow top has an interior hole and fork limbs embracing the assembly of the inner ends of the pivoted limbs. The fork limbs include pivot holes for receiving the pivot which connects the pivoted limbs to the bow top. A centralizing member is held between and is keyed to the inner ends of the pivoted limbs. A portion of the centralizing member projects upwardly into the interior hole of the bow top. The centralizing member includes an elongated pivot receiving hole. The centralizing member is effective to press against a side wall of the hole in the bow top to cause the bow top to turn and keep central upon any angular movement of one of the pivoted limbs with respect to the other pivoted limb. The bow top includes locating means cooperable with the inner ends to prevent movement of the inner ends toward the bow top beyond a position in which the pivot receiving holes in the inner ends and the bow top are aligned for receiving the pivot. This movement is prevented during the assembly of the instrument with the centralizing member being keyed in place between the inner ends of the two pivoted limbs which are positioned together, side by side, but before the installation of the pivot.

8 Claims, 8 Drawing Figures

DRAWING INSTRUMENT

BACKGROUND OF THE INVENTION

This invention relates to drawing instruments in the form of drawing compasses or dividers.

An object of the invention is to provide a drawing compass, or dividers, of a construction such as to enable the instrument to be inexpensively made as a mass produced article suitable for use by, for example, school children.

SUMMARY OF THE INVENTION

According to the invention, a drawing instrument which is a compass or dividers has a leg and an arm, or two legs, pivoted together to form an assembly at inner ends thereof. A bow top has an interior aperture and fork limbs embracing the assembly of pivoted ends of the leg and arm or of the two legs. The leg and arm, or said legs, and said limbs of the bow top, include pivot holes for receiving a pivot which pivots together the leg and arm, or the legs, and the bow top. The bow top includes locating means co-operable with the inner ends of the leg and arm, or of the legs, to prevent, during assembly of the instrument before installation of the pivot, movement of said ends towards the bow top beyond a position in which the pivot holes in the inner ends and bow top are aligned for receiving the pivot.

Thus, assembly of the bow top to the leg and arm, or legs, is facilitated in a time-saving manner. Thus, the production cost of the instrument is reduced compared with the cost of producing an instrument in which no means are provided for aligning the pivot-receiving holes for receiving the pivot.

A centralizing member is held between and keyed to the inner ends of the leg and arm, or of the two legs. The centralizing member includes a portion projecting up into the interior aperture or recess in the bow top. Thus, angular movement of the leg, or the one leg, relatively to the arm, or the second leg, causes the centralizing member to press against a side wall of the interior aperture or recess to cause the bow top to turn and keep central. The centralizing member includes a pivot-receiving hole for receiving the pivot. Thus, the locating means prevents, during assembly of the instrument, but before installation of the pivot, movement of said inner ends, with the centralizing member keyed in place therebetween, towards the bow top beyond a position in which the pivot-receiving holes in said inner ends and said bow top are aligned for receiving the pivot.

The locating means co-operable with the inner ends of the leg and arm, or of the legs, comprise shoulders or projections integrally formed on the inside faces of the fork limbs of the bow top. In one embodiment, the locating means comprise two pairs of shoulders or projections. One pair of the shoulders are integrally formed on the inside face of each fork limb of the bow top. The two shoulders or projections of each pair are spaced apart to receive between them a curbed top edge portion of a respective one of the aforesaid inner ends. Each shoulder or projection on said two pairs of shoulders or projections has a rounded or oblique outer end surface. These rounded or oblique outer end surfaces form lead surfaces for centering the inner ends of the leg and arm, or of the legs, with respect to a center line of the bow top during assembly of the instrument, before insertion of the pivot.

The pivot may be a screw or bolt held in place by a nut. The bow top may be composed of plastics material. One of the fork limbs of said plastics bow top may have an exterior face having a coned recess surrounding, and co-axial with, the pivot hole in said limb. The coned recess is countersunk so that when the pivot screw or bolt is tightened, the nut is drawn whereby to embed itself firmly into the plastics material of the limb. Preferably, the other fork limb has an exterior face having a countersunk coned recess to receive the head of the screw or bolt.

BRIEF DESCRIPTION OF DRAWINGS

Other objects of this invention will appear in the following description and appended claims, reference being made to the accompanying drawings forming a part of the specification wherein like reference characters designate corresponding parts in the several views.

(FIGS. 4 and 5 are on a larger scale than the other Figures);

DESCRIPTION OF SPECIFIC EMBODIMENTS

Figure 4:
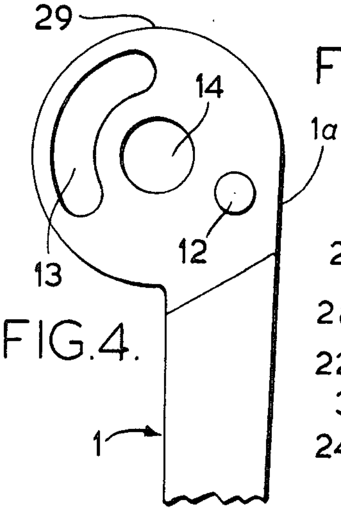
FIG. 4 is an inside face view of the upper portion of a leg of the compass shown in FIG. 1.
Figure 1:
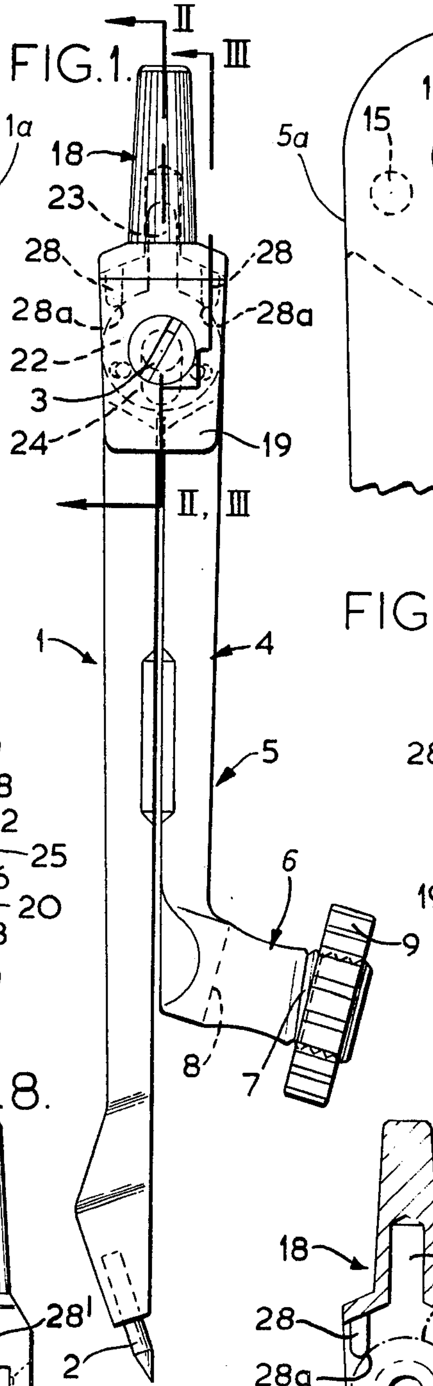
FIG. 1 is a front elevational view of a compass.

Referring to FIGS. 1 to 6 of the drawings, a drawing compass comprises a die-cast metal leg 1 having a pointed element 2 at its one end. A mild steel screw 3 pivotally connects the inner end of leg 1 to one end of a shank 4 of a diecast arm 5. The other or outer end of shank 4 has an integral laterally-projecting stub or barrel 6 which has an external screw thread 7 thereon and is formed with a socket hole 8 for receiving a pencil, or the like. An internally screw-threaded knurled clamping ring 9 is mounted on the stub or barrel 6 and is operatively engaged with the external screw thread 7. Ring 9 clamps the pencil or the like in place in the socket hole 8 in the stub or barrel 6.

The compass leg 1 has an integral die-cast stop projection 12 and an arcuate recess 13 at its pivoted end with a plain hole 14 for the pivot screw 3. Projection 12, recess 13 and hole 14 are formed in the die-casting of leg 1. The arm 5 has an integral die-cast stop projection 15 identical with the projection 12, an arcuate recess 16 identical with the recess 13, and a plain hole 17 for engagement by the pivot screw 3, all at its pivoted end. The stop projection 12 engages into the recess 16, and the stop projection 15 engages into the recess 13 providing a simple and robust stop means acting against angular opening-out movement, beyond a predetermined angular limit, of the parts 1 and 5, with respect to each other.

The compass shown has a bow top 18 composed of nylon and integral fork limbs 19 which embrace the assembly of pivoted ends of the leg 1 and arm 5. Bow top 18 is held in place by the pivot screw 3 which engages holes 20 in fork limbs 19. The bow top 18 includes an interior recess 21 having a mouth presented towards the pivoted-together ends of the leg 1 and arm 5.

A still centralizing plate 22 is mounted on pivot screw 3 and held between said pivoted-together ends of the leg 1 and arm 5. Plate 22 has a pair of circular holes which are respectively engaged one with each of the projections 12 and 15. Thus, plate 22 is keyed to said pivoted-together ends of the leg 1 and arm 5.

The plate 22 has an integral upper tongue or projection portion 23 which projects into the interior recess 21 in the bow top. Thus, tongue portion 23 presses against a wall of recess 21 upon angular movement of one of the members 1 and 5 with respect to the other of said members 1 and 5. During the angular movement, bow top 18 turns about the axis of screw 3 and keeps central with respect to the parts 1 and 5. The screw 3 passes through an elongated hole 24 in the centralizing plate 22. Hole 24 is elongated to permit plate 22 to move transversely to the pivot screw 3 when turning about said screw 3.

A mild steel nut 25 holds screw 3 in place adjacent the outer face of one of the fork limbs 19 of bow top 18. The outer face of limb 19 has coned recesses 26 and 27 which surround and are co-axial with a pivot hole 20. Coned recess 26 is of countersunk form. Thus, when screw 3 is tightened, nut 25 is drawn to embed itself firmly into the nylon material of the limb 19. The coned shape of the recess 26 assists the embedding of the nut 25 into the nylon material. Furthermore compared with a case in which a nut is received in a hexagonal recess, nut 25 can be drawn into the recess 26 irrespective of the rotational position of the nut 25 on the screw 3. However, if the recess were hexagonal, nut 25 would have to be positioned so that its corners were in register with the corners of the recess before it could be drawn into the recess. Coned recess 27 is of countersunk form for receiving the head of screw 3 which, when tightened, draws its head into recess 27 and embeds into the nylon material of limb 19.

Figure 6:
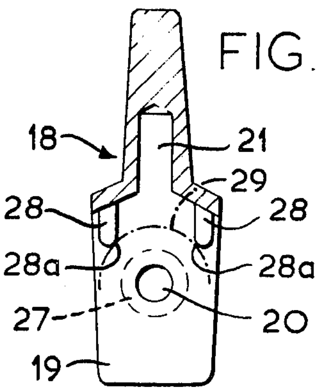
FIG. 6 is a longitudinal sectional view through a bow top of the compass shown in FIG. 1.

A pair of shoulders or projections 28 are integrally formed on the inside face of each limb 19. Projections 28 are spaced apart so as to receive between them, as shown in FIG. 6, a curved top edge portion 29 of a respective one of the pivoted together inner ends of the leg 1 and arm 5. The two shoulders or projections 28 on the one limb 19 snugly receive a curved top edge portion 29 of the inner end of the leg 1 between them. The two shoulders or projections 28 on the other limb 19 snugly receive between them a curved top edge portion 29 of the inner end of the arm 5.

In assembling the compass shown, the inner ends of the leg 1 and arm 5 are, before installation of the pivot screw 3, positioned together side-by-side with the centralizing plate 22 located therebetween and keyed in place by the stop projections 12 and 15. The resulting sub-assembly of the leg 1, arm 5 and plate 22 is moved relatively to the bow top 18 so that the inner ends of the leg 1 and arm 5 enter between the fork limbs 19 and the tongue portion 23 of the centralizing plate enters the interior recess 21.

The shoulders or projections 28 act as locating means which co-operate with the inner ends of the leg 1 and arm 5 to prevent movement of said sub-assembly towards the bow top beyond a position in which the respective pivot holes 14, 17 and 20 are all aligned for receiving pivot screw 3. After the inner ends of the leg 1 and arm 5 have entered between the fork limbs 19, and the tongue portion 23 of centralizing plate 22 has entered the interior recess 21, the movement of sub-assembly is continued with respect to bow top 18 until said movement is arrested by full engagement of the inner ends of the leg 1 and arm 5 with the respective pairs of the shoulders or projections 28. Then, holes 14, 17 and 20 are found to be correctly aligned for receiving screw 3 which is passed through the aligned holes and secured in place by nut 25. Thus the pivot-hole aligning shoulders or projections 28 considerably facilitate assembly of the compass leg and arm to the bow top. The shoulders or projections 28 have rounded (as shown), or oblique, end surfaces **28*a* which form lead surfaces. Thus, during assembly of the compass, the lead surface center the inner ends of leg 1 and arm 5 with respect to a center line of bow top 18 if the subassembly happens to be offset from the center line of the bow top when entering between fork limbs 19**.

The compass shown is of a neat and robust construction which can be inexpensively manufactured by mass production.

The material of the die-cast leg 1 and arm 5 may, for example, be of a zinc-based metal alloy.

The parts of the compass shown may be of any other suitable material. However, it is preferred that leg 1 and arm 5 be of die-cast metal and that the bow top 18 be of plastics material.

Figure 2:
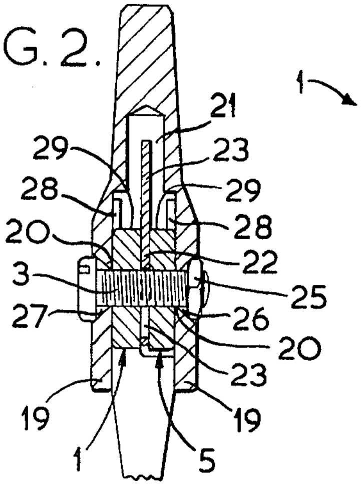
FIGS. 2 and 3 are sectional views along the lines II—II, FIG. 1; and III—III, FIG. 1 respectively, through the top portion of the compass shown in FIG. 1.
Figure 3:
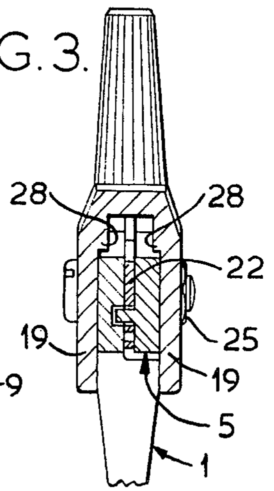

If desired, the arrangement having the pivot hole aligning shoulders or projections 28 and the coned recesses 26 and 27, shown in FIGS. 2 and 3, may be incorporated in dividers having a pair of legs. Here, each leg carries a pointed element at its lower end. One of said legs corresponds to leg 1 of the arrangement shown and with the other leg takes the place of arm 5.

If desired, the centralizing member 22 may be keyed in place in some other way instead of being keyed by stop projections 12, 15; or may be omitted entirely.

Other means for limiting opening-out movement may be used instead of the arrangement of stop projections 12 and 15 and recesses 13 and 16, as shown. For example, only one stop projection and one arcuate recess (or aperture) may be used. However, the use of two stop projections and two arcuate recesses shown is preferred because of the robustness it imparts.

The bow top may have any suitable pivot-hole aligning means which cooperate with the inner ends of the leg and arm (or of two legs), instead of the two pairs of shoulders or projections 28 shown. If desired, the bow top having pivot-hole aligning means cooperable with said inner ends may be on an instrument not having a coned recess for receiving a nut of a pivot screw, and/or a coned recess for receiving a head of a pivot screw.

The instrument shown in FIGS. 1 to 6 of the drawings is of robust construction. However, if excessive opening-out force is applied to the parts 1 and 5, it might cause shearing of the die-cast stop projections 12 and 15. Then the centralizing plate 22 shown would become inoperative because it would not be keyed in place.

Figure 5:
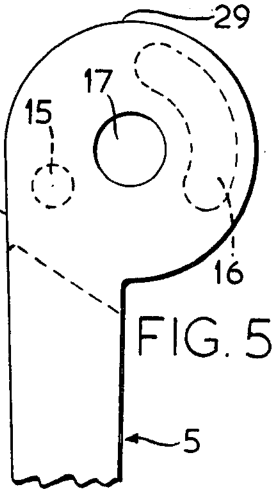
FIG. 5 is an outside face view of the upper portion of an arm of the compass shown in FIG. 1
Figure 7:
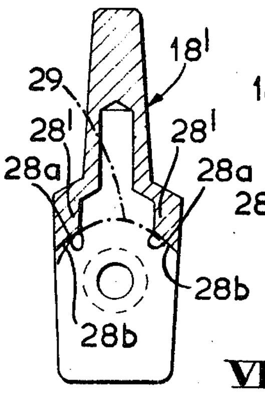
FIGS. 7 and 8 are two views of a modified bow top, FIG. 7 being a sectional view along the line VII—VII, FIG. 8.
Figure 8:
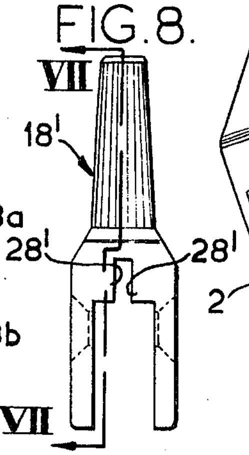

To avoid such an occurrence, the modified bow top 18' of the instrument may be used as shown in FIGS. 7 and 8. In this modification, bow top 18' is composed of nylon or any other suitable material and has two pairs of pivot-hole aligning shoulders or projections 28' which cooperate with the edges 29 of the parts 1 and 5. The shoulders or projections 28' have end surfaces **28*a* which form lead surfaces such as in projections 28. However, in this modified bow top 18', shoulders or projections 28' have integral lower extensions including oblique surfaces $28^b$. One surface $28^b$ is on one of the pair of shoulders or projections 28' on the one fork limb and another surface $28^b$ is on one of the pair of shoulders or projections 28' on the other fork limb. The two surfaces $28^b$ are at opposite sides of the axis of the pivot 3 and form stop surfaces respectively engagable with straight edge portions $1^a$ and $5^a$ of the leg 1 and arm 5 as shown in FIGS. 4 and 5. Thus, surfaces $28^b$ act against angular opening-out movement of the leg 1 and arm 5 beyond a predetermined angular limit position. The oblique stop surfaces $28^b$ on the plastics bow top 18' are so located that the two die-cast projections 12 and 15 cannot bear against the ends of the respective arcuate recesses 16 and 13 before the oblique stop surfaces $28^b$ bear against the edges $1^a$ and $5^a$. Thus, at least part of the shock or strain resulting from such opening out to the limit is taken by oblique stop surfaces $28^b$. Consequently, the possibility of opening out with excessive force causing shearing of the die-cast projections 12 and 15** is considerably reduced or obviated.

The arrangement shown in FIGS. 7 and 8 is also shown and described in our copending U.S. application Ser. No. 817,103, filed July 19, 1977.

While the drawing instrument has been shown and described in detail, it is obvious that this invention is not to be considered as being limited to the exact form disclosed, and that changes in detail and construction may be made therein within the scope of the invention, without departing from the spirit thereof.

I claim:

1. A drawing instrument comprising:
(a) a pair of limbs including pivot holes in the inner ends thereof,
(b) a pivot received in said pivot holes and pivoting together said limbs forming an assembly at said inner ends,
(c) a bow top having an interior hole and fork limbs embracing the assembly of said inner ends of the pivoted limbs,
(d) said fork limbs including pivot holes for receiving said pivot which connects said pivoted limbs to the bow top,
(e) a centralizing member held between and keyed to said inner ends and including a portion which projects up into said interior hole,
(f) said centralizing member including an elongated pivot receiving hole,
(g) said centralizing member being effective to press against a sidewall of said hole in the bow top to cause the bow top to turn and keep central upon any angular movement of the one said pivoted limb with respect to the other said pivoted limb, and
(h) said bow top including locating means cooperable with said inner ends to prevent, during assembly of the instrument with the centralizing member keyed in place between said inner ends of the two pivoted limbs positioned together side by side but before installation of the pivot, movement of said inner ends toward the bow top beyond a position in which said pivot receiving holes in said inner ends and said bow top are aligned for receiving the pivot.

2. A drawing instrument as defined in claim 1 wherein
the locating means comprise projections integrally formed on the inside faces of the fork limbs of the bow top.

3. A drawing instrument as defined in claim 1 wherein
said locating means comprise two pairs of shoulders, one pair of said shoulders being integrally formed on the inside face of each fork limb,
the two shoulders of each pair being spaced apart to receive between them a curved top edge portion of a respective one of the inner ends of the pivoted limbs.

4. A drawing instrument as defined in claim 3 wherein
each shoulder has a rounded or oblique outer end surface forming a lead surface for centering the inner ends of the pivoted limbs with respect to a center line of the bow top during assembly of the instrument before insertion of the pivot.

5. A drawing instrument as defined in claim 1 wherein
each pivoted limb includes a stop projection and an arcuate slot at said inner ends,
the opposing stop projections engage with the respective arcuate slot in the opposing inner ends,
said stop projections acting against angular opening-out movement of the one pivoted limb with respect to the other pivoted limb beyond a predetermined angular limit.

6. A drawing instrument as defined in claim 1 wherein
the stop projections are effective to key the centralizing member to said inner ends of the pivoting limbs.

7. A drawing instrument as defined in claim 1 wherein
the bow top is composed of plastics material and the pivot is a screw,
one of said fork limbs of the bow top has an exterior face with a coned recess surrounding the coaxial with the pivot hole in said fork limb,
said coned recess being countersunk to receive said nut with the screw is tightened to embed itself firmly into the plastics material of said limb.

8. A drawing instrument as defined in claim 7 wherein
the other fork limb has an exterior face with a countersunk cone recess to receive the head of said screw.

* * * * *